Patented Dec. 23, 1930

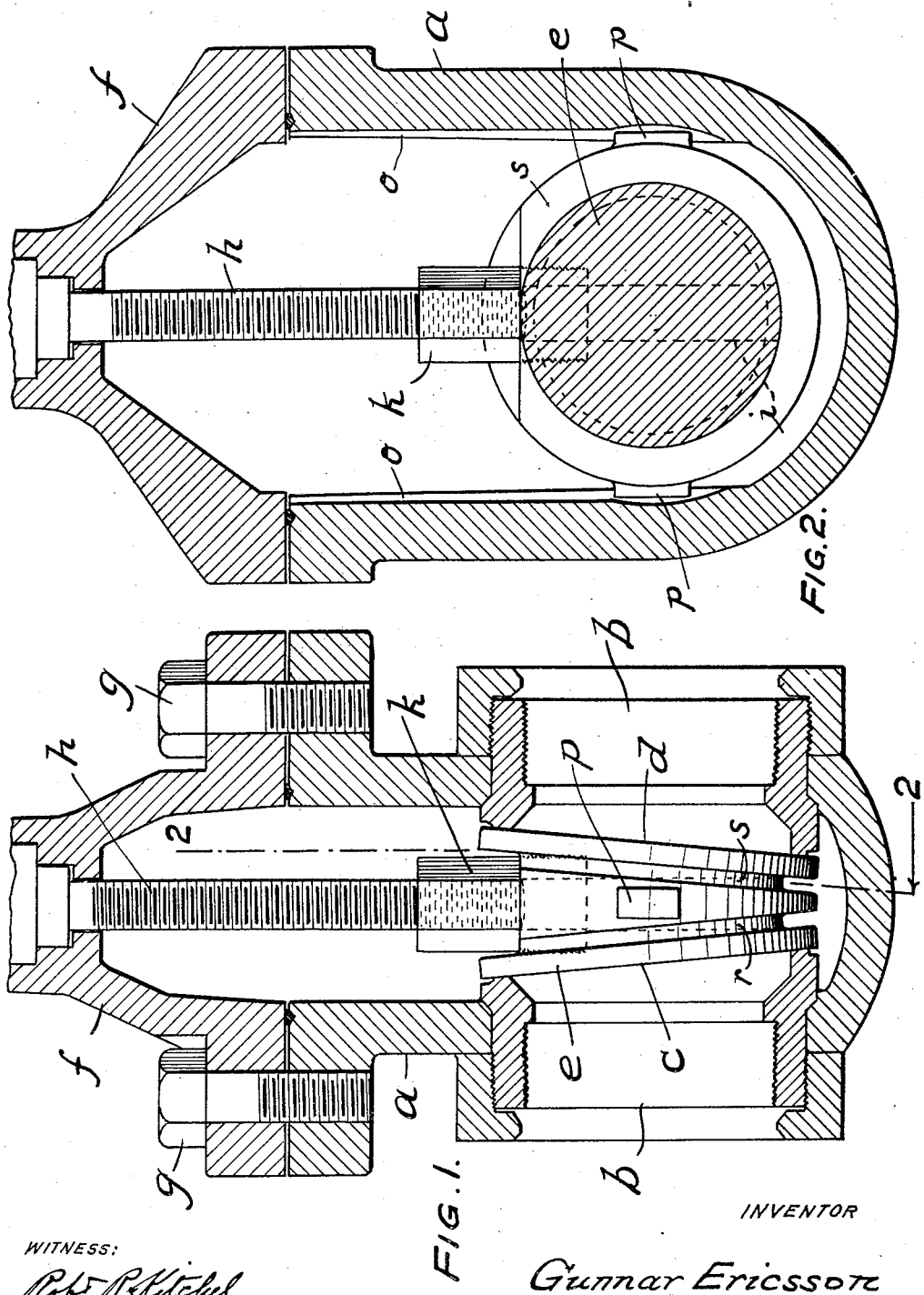

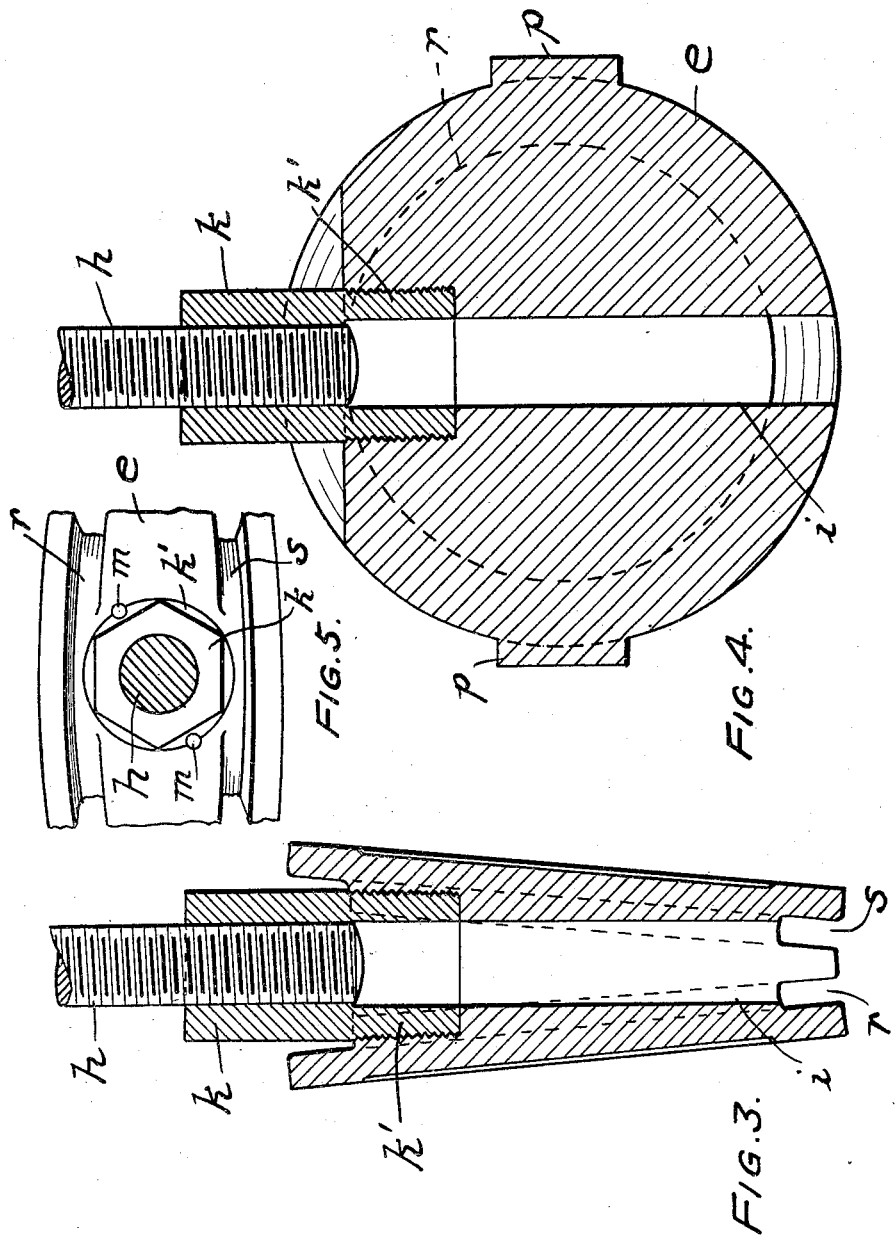

1,786,295

UNITED STATES PATENT OFFICE

GUNNAR ERICSSON, OF PHILADELPHIA, PENNSYLVANIA

HIGH-DUTY VALVE STRUCTURE

Application filed December 30, 1927. Serial No. 243,636.

In applications filed by me April 23, 1927, Serial Nos. 186,016 and 186,017, I disclosed a valve adapted to control high pressure fluids, as, for example, heavy duty valves used in oil well drilling. The present invention relates to valves of this character, although it does not necessarily embody any of the novel features set forth in said patent applications.

The object of the invention is to provide a valve so constructed as to adapt it, when closed, to fit perfectly on its valve seats, whether or not the valve seats and the faces of the valve adapted to engage said seats are in perfect alignment and whether or not the valve, as it engages its seats, occupies the precise position which it should occupy to enable the abutting faces of valve and valve seats to exactly coincide. The invention also comprises novel means to connect the valve with the valve rod and to guide the valve properly toward its seat.

In the drawings, which show a preferred embodiment of my invention, together with some valuable and important, but not indispensable, details of structure:

Fig. 1 is an elevational section through the valve structure, with the valve in elevation;

Fig. 2 is an elevational section through the valve structure on the line 2—2 of Fig. 1;

Fig. 3 is a vertical section, enlarged, through the valve, looking in the same direction as in Fig. 1;

Fig. 4 is a vertical section through the valve, taken at right angles to the section shown in Fig. 3;

Fig. 5 is a plan view of the valve.

The valve casing $a$ is provided, on opposite sides, with aligning openings that receive rings $b$, $b$, provided respectively with circular valve seats $c$ and $d$. The planes of the two valve seats converge toward the bottom of the valve casing.

The valve $e$ looking in one direction (see Figs. 2 and 4) is disc-shaped, and looking at right angles thereto (see Figs. 1 and 3) is wedge-shaped. The flat faces of the valve converge, from top to bottom, at the same angle, as near as is possible, to the angle of convergence of the opposing faces of valve seats $c$ and $d$. Thereby the valve is adapted to be seated, when lowered, to close the openings in the valve casing.

The valve rod $h$ (on which valve $e$ is threaded as hereinafter described) extends up through the valve casing and valve cover $f$ and is provided, at its upper end, with a handwheel (not shown) for turning the rod and thereby lifting the valve off its seat.

The valve casing, which is oblong in horizontal section, is provided, at its upper end, on its opposite long sides, with flanges, and the valve casing cover $f$, which is of corresponding shape, is provided with similar flanges. Bolts $g$ extend through the flanges of casing and cover and secure them together.

It has been found impracticable to so ideally accurately plane the faces of valve seats $c$ and $d$ and the opposite flat faces of the valve $e$ as to insure perfect seating of the valve. Moreover, the slightest tilting of the valve with relation to its vertical axis, or the slightest tilting of the valve with relation to its horizontal axis, will prevent the proper seating of the valve on its seats even though the seating faces have been accurately formed. In a high duty valve, any failure of the valve to completely and accurately seat will give rise to leakage and impair or destroy the efficiency of the valve.

I have succeeded in insuring a perfect seating of the valve by giving to the valve a slight degree of flexibility without impairing its strength. This is effected by forming in the valve two circular grooves $r$, $s$, respectively parallel to, and spaced from, the opposite seating faces of the valve, thereby forming marginal webs or flanges that engage the circular valve seats. Thus, the valve is converted from an absolutely rigid body to a body which is adapted to flex, under downward pressure of the valve, to the very slight degree that may be required to insure perfect seating of the valve on its seats.

The top of the valve is cut away, between said marginal webs, tangential to the bottoms of the grooves, to form a flat top face. The valve is bored through, along a vertical line coincident with the axis of the valve rod $h$, to form a hole $i$ adapted to receive the valve rod when the valve is lifted off its seat as hereinbefore described.

The upper end of the hole $i$ is enlarged in diameter to form a circular recess adapted to receive a nut $k$, which is threaded into said recess, as shown in Figs. 3 and 4 and projects a substantial distance above the valve. The part of the nut projecting above the flat upper face of the valve is hexagonal in shape, the planes of the sides of the hexagon (see Fig. 5) coinciding with arcs on the upper face of that part $k$ of the nut $k$ which is threaded into the valve. Set screws or pins $m$ extend downward into recesses formed partly in the valve $e$ and partly in the nut $k$ and thereby lock the nut from turning in the valve.

Rod $h$ is threaded into nut $k$. Thereby, by rotating the rod $h$, the valve may be seated or lifted off its seat.

The valve casing is provided, along its narrow sides, with vertical guide grooves $o$, which are adapted to receive projections $p$ on the valve, whereby the valve is held from turning on its vertical axis while being moved up and down.

Having now fully described my invention, what I claim and desire to protect by Letters Patent is:

1. A valve structure comprising a valve casing provided with substantially circular valve seats surrounding openings in opposite sides of the valve casing, the planes of the two valve seats converging, and a valve having a wedge shape substantially corresponding to the converging planes of the valve seats and having opposite faces of substantially circular contour adapted adjacent their peripheries to engage the respective valve seats, the valve being provided with grooves extending in planes substantially parallel to the respective planes of the seating faces of the valve and on opposite sides of a plane extending centrally through the valve at right angles to its transverse axis, thereby providing marginal webs respectively engaging the circular valve seats and adapted to flex to the degree required to insure accurate seating of the valve while providing also a substantially solid body within said webs and between said grooves to maintain the valve approximately rigid when seated.

2. A valve structure comprising a valve casing provided with substantially circular valve seats surrounding openings in opposite sides of the valve casing, the planes of the two valve seats converging, and a valve having a wedge shape substantially corresponding to the converging planes of the valve seats and having opposite faces of substantially circular contour adapted adjacent their peripheries to engage the respective valve seats, the valve being provided with grooves extending in planes substantially parallel to the respective planes of the seating faces of the valve and on opposite sides of a plane extending centrally through the valve at right angles to its transverse axis, the thick end of the valve, between said grooves, being recessed, said valve having a valve rod receiving hole opening in said recess.

3. A valve structure comprising a valve casing provided with substantially circular valve seats surrounding openings in opposite sides of the valve casing, the planes of the two valve seats converging, and a valve having a wedge shape substantially corresponding to the converging planes of the valve seats and having opposite faces of substantially circular contour adapted adjacent their peripheries to engage the respective valve seats, the valve being provided with substantially circular grooves extending in planes substantially parallel to the respective planes of the seating faces of the valve and on opposite sides of a plane extending centrally through the valve at right angles to its transverse axis, the thick end of the valve, between said grooves, being cut away in a plane whose lengthwise extension is substantially tangential to the bottoms of said grooves, the valve having a hole to receive the valve rod, said hole being enlarged, adjacent said cutaway portion, to provide a recess, a nut fixedly secured in said recess, and a valve rod threaded in said nut.

4. A valve structure comprising a valve casing provided with substantially circular valve seats surrounding openings in opposite sides of the valve casing, the planes of the two valve seats converging, and a valve having a wedge shape substantially corresponding to the converging planes of the valve seats and having opposite faces of substantially circular contour adapted adjacent their peripheries to engage the respective valve seats, the valve being provided with grooves extending in planes substantially parallel to the respective planes of the seating faces of the valve and on opposite sides of a plane extending centrally through the valve at right angles to its transverse axis, thereby providing marginal webs respectively engaging the circular valve seats, the valve being cut away at its upper thick edge between planes substantially coincident with the inner faces of the marginal webs, the valve having a valve rod receiving hole extending through its vertical axis and enlarged at its upper end, a nut fixedly secured in said enlargement, and a valve rod threaded into said nut.

In testimony of which invention, I have hereunto set my hand, at Philadelphia, Pennsylvania, on this twenty-third day of December, 1927.

GUNNAR ERICSSON.